Dec. 27, 1960     C. E. LEONARD     2,965,997
FISH LURE
Filed May 15, 1957
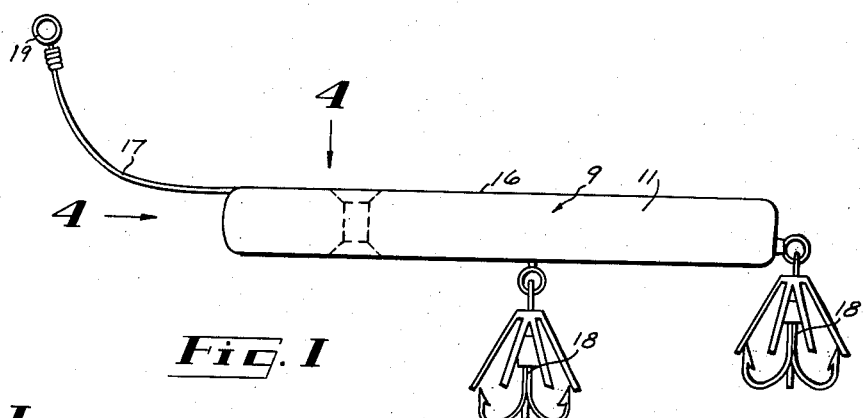
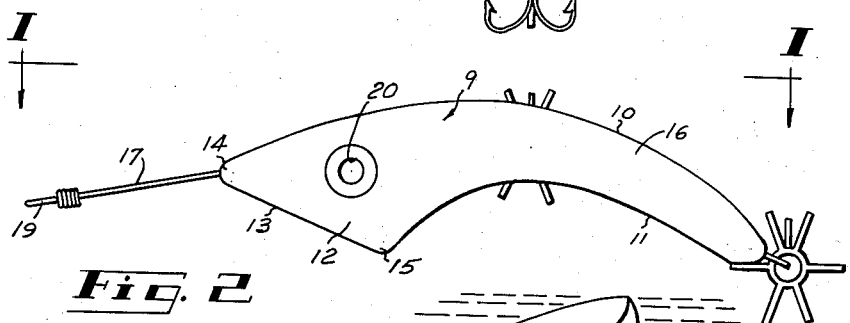
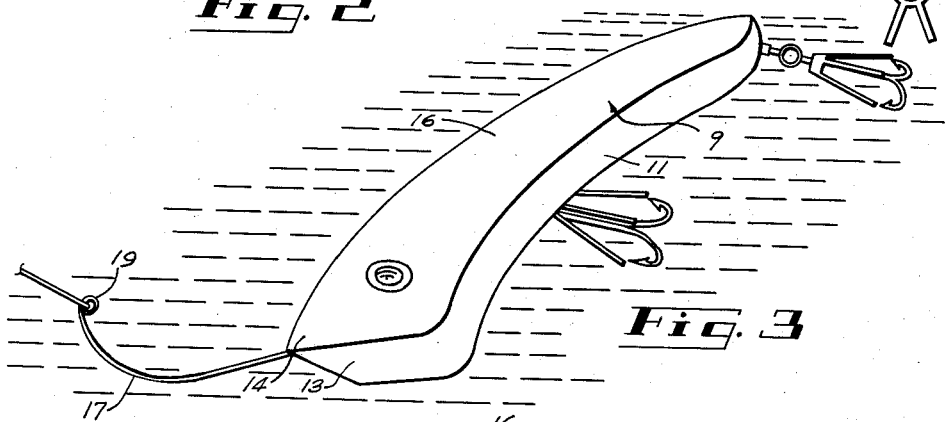
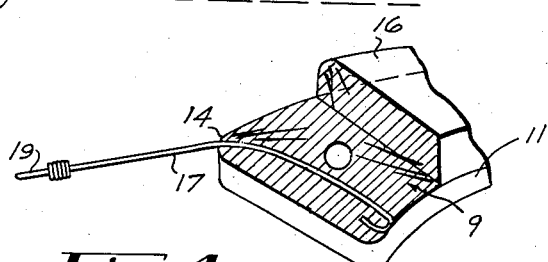
INVENTOR.
CLARENCE E. LEONARD
BY
Donnelly, Mentag & Harrington
ATTORNEYS

United States Patent Office 2,965,997
Patented Dec. 27, 1960

2,965,997

FISH LURE

Clarence E. Leonard, 20405 Martin Road,
St. Clair Shores, Mich.

Filed May 15, 1957, Ser. No. 659,340

1 Claim. (Cl. 43—42.48)

My invention relates to a new and useful improvement in a fish lure.

An object of the invention is the provision of a fish lure so constructed and arranged that when drawn through the water a novel action or motion is imparted to the lure. The lure, when drawn through the water, will dart first to one side and then to the other, this motion extending a considerable distance laterally. While being drawn through the water, the lure also will dip up and down, sometimes even clearing the surface of the water so as to very closely resemble the "jumping" movement of a fish. This motion laterally and vertically, might be termed a spiral movement, and will so be referred to herein.

Another object of the invention is the provision of a lure having a planar body provided with a relatively stiff lead wire extending forwardly from the body and upwardly of one of the faces of the body.

Another object of the invention is the provision of a lure having a planar body with arcuate opposite sides which are not symmetrical so that at the forward end of the body there is a greater width present than at the rear end.

Other objects will appear hereinafter.

It is recognized that various modifications and changes may be made in the details of the structure illustrated without departing from the invention, and it is intended that the present disclosure shall be considered to be but the prefered embodiment.

Forming a part of this application are the drawings, in which:

Fig. 1 is an elevational view of the invention;

Fig. 2 is a plan view of the invention;

Fig. 3 is a perspective view of the invention;

Fig. 4 is a fragmentary view of the forward end of the invention with a part broken away.

As shown in the drawings, the lure comprises a body 9 having parallel planar upper and lower faces 16 an arcuate side 10 and an arcuate side 11. It will be noted that these arcs are not of equal length so that there is thus provided at the forward end of the body the enlarged portion or head 12. A plane face 13 extends to the forward tip 14 from the shoulder 15.

In Fig. 4, I have shown a portion of the body 9 broken away downwardly from the upper face 16. A relatively stiff lead wire 17 is embedded in the body and extends from the tip or front end 14 to the arcuate side 11. This wire, as clearly shown in Fig. 1, extends forwardly from the body of the lure at the junction of the plane face 13, the upper planar face 16, and the longer arcuate side 10 and then upwardly from the face 16 which may be termed the top face.

Secured to the medial portion of the body 9, and to the rear end of the body 9, are the hooks 18. This lead wire 17 is provided with an eyelet 19 to which the fishing line is attached. Formed through the body 9, at the enlarged forward portion, is a passage 20 which is decorated on the opposite face of the body so at to resemble a fish eye.

When cast out, the lure will strike the surface of the water so as to lie flat when in the position shown in Fig. 1. As the lure is moved through the water it will move very rapidly first to one side and then to the other, and at the same time the nose will cause the lure to dip or sink downwardly in the water. As this motion continues, this lateral spiral movement will continue and the lure also will rapidly rise toward the surface of the water, sometimes even clearing the surface, thus the lure has the appearance of jumping.

When the lure is dragged through the water and moves itself below the surface of the water, the lure will stand at an angle of practically 45° to the surface of the water, the large or forward end of the lure being down, the lure will tilt to this angle before the spiral movement takes place. By having the lure in this tilted position when being drawn through the water, the body of the lure itself serves as some protection for the hooks against weeds and the like.

The body of the lure is colored, and any suitable enamel which will reflect light will suffice. By having the surfaces light reflecting, the lure in making its different movements will also produce a "flash." This flash is sometimes visible to the fisherman when the lure is in the water to a depth that the body of the lure itself cannot be seen.

Experience has also shown that the variation in the number of hooks mounted on the body does not interfere with or change the spiral movement of the body.

What I claim is:

A fish lure of the class described, comprising: a body having a pair of oppositely disposed parallel planar upper and lower faces; a pair of curvilinear side faces connecting said planar faces, one of said curvilinear side faces being shorter than the other and terminating rearwardly of the forward end of the other; a planar face at the forward end of the lure connecting said curvilinear side faces; a relatively stiff lead wire connected to said body at the forward end thereof and extending outwardly from the forward tip of the body formed by the junction of the forward end planar face, the longer of said curvilinear side faces and the upper planar face; and, said lead wire extending forwardly from said body and then upwardly from the upper planar face.

References Cited in the file of this patent

UNITED STATES PATENTS

| | | |
|---|---|---|
| 1,031,149 | Royer | July 2, 1912 |
| 1,745,006 | Chapleau | Jan. 28, 1930 |
| 2,463,626 | Johnson | Mar. 8, 1949 |
| 2,642,695 | Burns | June 23, 1953 |
| 2,743,545 | Seneker | May 1, 1956 |